I. REINESS.
HAT PIN.
APPLICATION FILED APR. 10, 1909.

945,603.

Patented Jan. 4, 1910.

Witnesses:
D. W. Gardner.

Inventor:
Israel Reiness
By his Attorney

UNITED STATES PATENT OFFICE.

ISRAEL REINESS, OF NEW YORK, N. Y.

HAT-PIN.

945,603.  Specification of Letters Patent.  Patented Jan. 4, 1910.

Application filed April 10, 1909. Serial No. 489,147.

*To all whom it may concern:*

Be it known that I, ISRAEL REINESS, a citizen of the United States, residing in the borough of Manhattan, city, county, and State of New York, have invented certain new and useful Improvements in Hat-Pins, of which the following is a specification.

My improvements relate to ladies' hat pins used for securing a hat to the hair of the wearer. It is well known that these pins are necessarily of considerable length and that in use the points of the pins protrude beyond the hat, and are not only a source of danger but are also unattractive in appearance.

My invention consists in the construction and arrangement of parts hereinafter described and claimed specifically, the distinguishing feature being the use of a finger piece interposed between the clutch casing and the head of the clutch tube, said finger piece being of greater diameter than the clutch casing and being preferably loosely mounted upon the clutch tube and movable longitudinally thereon between the clutch tube head and the clutch casing as set forth.

Figure 1:
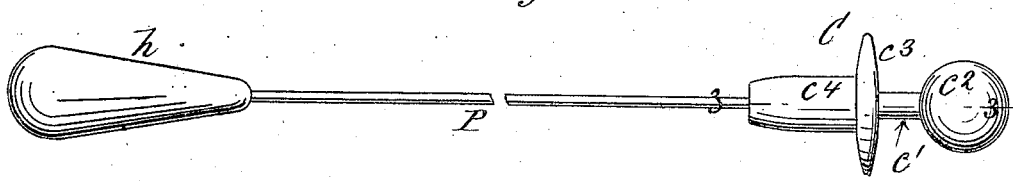
Figure 2:
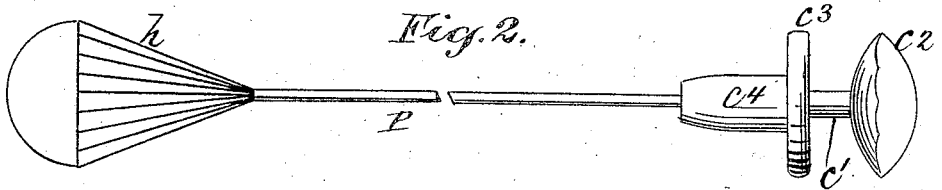
Figure 3:
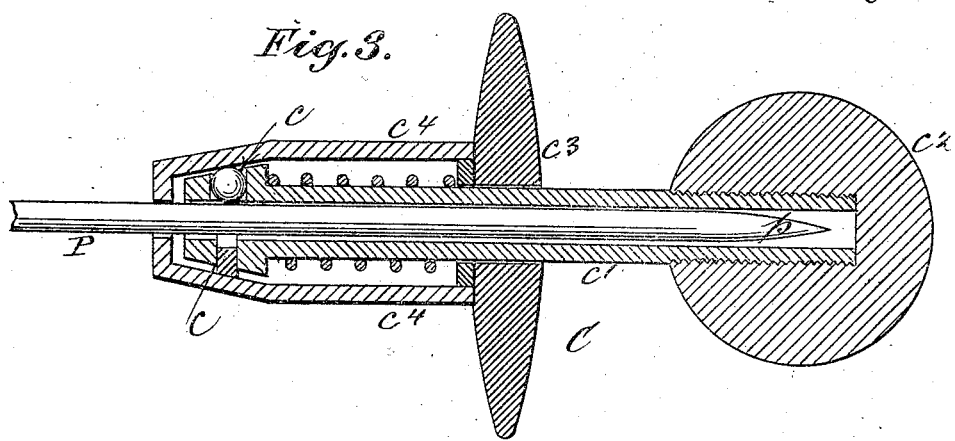
Figure 4:
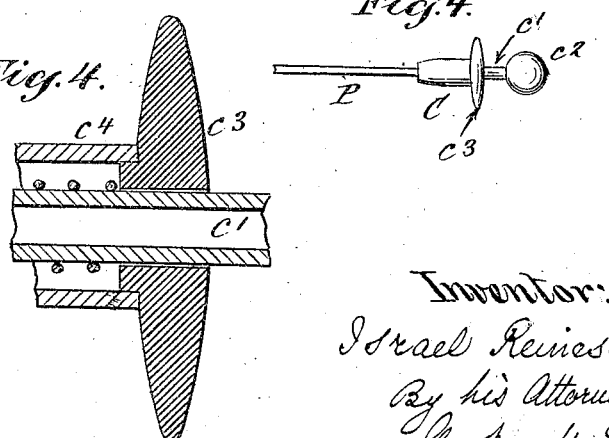

In the accompanying drawings, Figures 1 and 2, are elevation of possible variations in the form of my improved hat pin, broken away centrally; Fig. 3, is a sectional elevation on plane of line 3—3 Fig. 1; Fig. 4, is an elevation of the cap and end of the pin, actual size.

The main portion of the hat pin P, is formed with the usual ornamental head $h$, of any desired configuration or design while its pointed end $p$, is provided with a detachable imperforate cap C, consisting of a spring clutch $c$, having a clutch tube $c'$, the outer end of which is closed by a head $c^2$, of relatively large size or diameter as compared with the cross section of the clutch tube $c'$. This clutch tube head $c^2$, like the head $h$, of the pin P, may be of any desired design or configuration, since it answers the three functions of ornamentation, protecting and isolating the point of the pin, and affording a purchase or bearing whereby the clutch may be loosened from the pin. In this latter function the head $c^2$ is supplemented by a relatively broad annular bearing $c^3$, of greater diameter than, and resting against, the outer end of the clutch casing $c^4$, through which the clutch tube $c'$, passes, so that by pressing the fingers between said bearing $c^3$, and the head $c^2$, the clutch casing $c^4$, may be conveniently pressed back to release the spring clutch mechanism from the pin. In this connection it is to be noted that any well known spring clutch mechanism may be used in this connection and I herein show that disclosed in my Letters Patent No. 883,422 issued to me March 31st, 1908, simply as a matter of convenience of illustration and without confining myself thereto, since it is obvious that any mechanical expedient may be substituted therefor with like result, and without departing from the spirit and intent of my invention.

The broad finger bearing $c^3$, of greater diameter than the clutch casing $c^4$ is an important feature of my invention, in conjunction with the head $c^2$, since it admits of, and provides for the loosening of the clutch by means of the thumb and index finger of one hand alone,—the thumb and finger being pressed in between the head and bearing as above stated, so that it is not necessary to hold the casing $c^4$, of the clutch while loosening the clutch mechanism. When it is remembered that the other hand of the user is occupied in holding the head $h$, of the pin P, during the operation, it is obvious that the broad finger bearing of greater diameter than the clutch casing $c^4$ is practically indispensable in rendering the device operative in a convenient sense, since to hold the clutch casing $c^4$, with one hand and to pull the head $c^2$, simultaneously with the other would not only be a very difficult operation, but it would not result in the removal of the pin without the aid of a third hand, whereas by the provision and use of the finger bearing $c^3$, the operation becomes an easy and natural one entirely within the control of the wearer of the hat to which the pin is applied.

In Fig. 4, the cap is shown as of actual size in use, by reference to which it will be more readily understood that the bearing $c^3$, is an important factor in the practical use of the device. This finger bearing $c^3$, should be of sufficient size or diameter as related to the head $c^2$, to afford a broad and ample contact surface for the thumb and forefinger of the user. The finger bearing $c^3$, may also be utilized as a means of ornamentation, so that, in conjunction with the head $c^2$, the cap as a whole may be rendered attractive as well as useful. The finger bearing $c^3$, is not only of greater diameter than the clutch casing $c^4$, so as to afford a broad comfortable contact for the fingers on all and opposite sides of the clutch tube $c'$, as well as ample bearing against the end of the clutch casing $c^4$, in order that the latter may be quickly and conveniently forced back to release the clutch without pain or inconvenience to the fingers of the manipulator,—but it is also preferably loosely mounted upon the clutch tube $c'$, as shown clearly in Fig. 3, so as to be movable longitudinally thereon between the clutch casing $c^4$, and the head $c^2$, of the clutch tube $c'$. By thus mounting the finger bearing $c^3$, loosely upon the clutch tube $c'$, it is adapted to rest against the clutch tube head $c^2$, when not in actual use against the clutch casing, thereby presenting a more finished appearance,—and also preventing the accidental release of the clutch by contact with extraneous objects since unless there is an even pressure on opposite sides of the finger bearing $c^3$, the latter will "pinch" and bind upon the clutch tube and cannot be forced against the clutch casing. Obviously the greater diameter of the finger bearing $c^3$, as related to the clutch casing $c^4$, renders it an effectual finger protector in that it shields the fingers from direct contact with the sharp peripheral edge of the clutch casing.

I am aware that it has been proposed to furnish hat pins with imperforate point caps provided with spring clutch mechanism, and I do not seek to cover such end caps broadly.

What I claim as my invention and desire to secure by Letters Patent is,

The combination with a hat pin, of a detachable imperforate cap fitting over the point thereof, said cap being formed with a clutch casing and spring clutch mechanism and with a clutch tube formed with a head at its outer extremity of greater diameter than the tube itself, and a finger bearing of greater diameter than the clutch casing mounted loosely on the clutch tube and interposed between the clutch casing and the clutch tube head, for the purpose, and substantially in the manner described.

ISRAEL REINESS.

Witnesses:
D. W. GARDNER,
GEO. WM. MIATT.